United States Patent
Kim et al.

(10) Patent No.: US 11,705,561 B2
(45) Date of Patent: Jul. 18, 2023

(54) METHOD AND SYSTEM FOR CONTROLLING HYDROGEN PURGE

(71) Applicants: Hyundai Motor Company, Seoul (KR); Kia Motors Corporation, Seoul (KR)

(72) Inventors: Dae Jong Kim, Gyeonggi-do (KR); Jun Young Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 342 days.

(21) Appl. No.: 16/031,403

(22) Filed: Jul. 10, 2018

(65) Prior Publication Data
US 2019/0190042 A1 Jun. 20, 2019

(30) Foreign Application Priority Data

Dec. 18, 2017 (KR) .................. 10-2017-0174068

(51) Int. Cl.
| | |
|---|---|
| H01M 8/04 | (2016.01) |
| H01M 8/04223 | (2016.01) |
| H01M 8/04089 | (2016.01) |
| B60L 58/30 | (2019.01) |
| B60L 1/00 | (2006.01) |
| B60L 58/31 | (2019.01) |
| B60L 58/34 | (2019.01) |
| B60L 58/40 | (2019.01) |
| B60L 58/33 | (2019.01) |

(52) U.S. Cl.
CPC ......... *H01M 8/04231* (2013.01); *B60L 1/003* (2013.01); *B60L 58/30* (2019.02); *B60L 58/31* (2019.02); *B60L 58/33* (2019.02); *B60L 58/34* (2019.02); *B60L 58/40* (2019.02); *H01M 8/04089* (2013.01); *B60L 2210/10* (2013.01); *B60L 2240/527* (2013.01); *B60L 2240/547* (2013.01); *H01M 2250/20* (2013.01)

(58) Field of Classification Search
CPC ......... H01M 8/04992; H01M 8/04201; H01M 8/06; H01M 8/10; H01M 8/04955; H01M 8/04

See application file for complete search history.

(56) References Cited

U.S. PATENT DOCUMENTS

| | | | |
|---|---|---|---|
| 2005/0214604 A1* | 9/2005 | Goto ................ | H01M 8/04223 |
| | | | 429/429 |
| 2008/0213635 A1* | 9/2008 | Blaszczyk ......... | H01M 8/04462 |
| | | | 429/429 |
| 2017/0179511 A1 | 6/2017 | Jung et al. | |

FOREIGN PATENT DOCUMENTS

| | | |
|---|---|---|
| CN | 101640279 A | 2/2010 |
| CN | 103259030 A | 8/2013 |
| JP | 2005-276784 A | 10/2005 |
| KR | 10-2012-0060284 A | 6/2012 |

(Continued)

OTHER PUBLICATIONS

Office Action dated Nov. 24, 2022 in Chinese Application No. 201810833637.7.

*Primary Examiner* — Cynthia H Kelly
*Assistant Examiner* — Monique M Wills
(74) *Attorney, Agent, or Firm* — Fox Rothschild LLP

(57) ABSTRACT

A method and system of controlling hydrogen purge are provided. The method includes estimating an air supply rate supplied to a fuel cell stack and then executing hydrogen purge based on the estimated air supply rate.

8 Claims, 5 Drawing Sheets

(56) References Cited

FOREIGN PATENT DOCUMENTS

KR 10-1646404 B1 8/2016
KR 10-1679970 B1 11/2016

* cited by examiner

METHOD AND SYSTEM FOR CONTROLLING HYDROGEN PURGE

CROSS-REFERENCE TO RELATED APPLICATION

This application claims the priority benefit of Korean Patent Application No. 10-2017-0174068, filed on Dec. 18, 2017, the disclosure of which is incorporated herein by reference.

BACKGROUND

1. Field of the Invention

The present invention relates to a method and apparatus for controlling hydrogen purge, and more particularly, to a method and apparatus for controlling hydrogen purge during low-power driving.

2. Description of the Related Art

In general, a fuel cell is a device that directly converts fuel energy into electrical energy and is part of a system configured by disposing a pair of electrodes including positive and negative electrode across an electrolyte to achieve both electricity and heat via an electrochemical reaction of ionized fuel gas.

One of factors of determining electricity generation performance of a fuel cell is concentration of hydrogen of an anode in that the fuel cell generates electricity via a chemical reaction between hydrogen and oxygen. When a hydrogen concentration of at least about 70% is maintained, a fuel cell is capable of being driven without a drop in stack performance. Hydrogen supplied from a hydrogen tank has high concentration of 99.999% but a fuel cell is actually driven with hydrogen concentration of about 70% due to moisture generated during a reaction in a stack, nitrogen from an oxygen electrode, and a recirculation function of a hydrogen electrode.

To maintain concentration of a hydrogen electrode, hydrogen with high concentration is supplied from a hydrogen tank and a hydrogen purge function of externally discharging internal hydrogen with low concentration needs to be periodically performed. However, a fuel cell vehicle needs to satisfy hydrogen emission standards and, thus, needs to appropriately dilute and discharge hydrogen to prevent concentration of the discharged hydrogen from being temporarily enhanced during hydrogen purge. Accordingly, hydrogen purge is performed on an air outlet and internal hydrogen in discharged air is diluted and discharged.

FIG. 1 is a graph of a I-V performance curve for driving a fuel cell stack according to a prior art. Referring to FIG. 1, for the durability of a fuel cell stack, the fuel cell stack is driven to set an upper voltage (X[V]) and to limit a voltage in the fuel cell stack. In particular, a direct current/direct current (DC/DC) converter (BHDC) of a main bus end connected to the fuel cell stack is operated to adjust a voltage by battery charging and discharging. In region ② of stack current equal to or greater than Y[A], stack current equal to or greater than Y[A] generated from a fuel cell stack is used to drive a vehicle and is supplied to other balance of plant (BOPS) while an upper voltage (X[V]) or less is maintained and a high-voltage battery is recharged.

However, when such control is continuously performed, a high-voltage battery is fully recharged and is not capable of being recharged and, accordingly, the DC/DC converter is not capable of adjusting a voltage any longer and a stack voltage enters region ① of an upper voltage (X[V]) or more. In particular, to restrict and drive the fuel cell stack at the upper voltage or less, the fuel cell stack needs to be driven in lower state ③ than a conventional I-V performance curve and, accordingly, gas supplied to the fuel cell stack needs to be controlled more accurately.

However, when hydrogen supply is reduced, hydrogen may become insufficient and, accordingly, a backward voltage is generated which may cause damage to a hardware such as a membrane-electrode assembly (MEA) or a separating plate and, thus, a method of adjusting and controlling an air supply rate is used. Particularly, a revolution per minute (RPM) of an air compressor configured to supply air to a fuel cell stack and an opening degree of an air control valve disposed at an air outlet of the fuel cell stack may be operated to reduce an air supply rate supplied to the fuel cell stack and to degrade I-V performance of a stack in a section in which low current is required, restricting a voltage of the fuel cell stack. However, when hydrogen purge is performed while an air flow is decreased substantially, purged hydrogen flows backward to temporarily drop a stack voltage thus substantially affecting energy efficiency and the productivity of a fuel cell vehicle.

The matters disclosed in this section is merely for enhancement of understanding of the general background of the invention and should not be taken as an acknowledgment or any form of suggestion that the matters form the related art already known to a person skilled in the art.

SUMMARY

The present invention provides a method of providing hydrogen purge to prevent purged hydrogen from flowing backward to an air electrode during low-power driving.

In accordance with an aspect of the present invention, a method of controlling hydrogen purge may include estimating an air supply rate supplied to a fuel cell stack, and executing hydrogen purge based on the estimated air supply rate. The method may further include, prior to the estimating of the air supply rate, estimating a concentration of hydrogen and determining a timing when hydrogen purge is required.

The executing of hydrogen purge may include comparing the estimated air supply rate and a predetermined first air flow, and when the estimated air supply rate is equal to or greater than the predetermined first air flow, hydrogen purge may be executed at the timing when hydrogen purge is required. The predetermined first air flow may be set to a value equal to or greater than a minimum air supply rate at which purged hydrogen does not flow backward to a cathode. The executing of hydrogen purge may include executing hydrogen purge not to reduce an air supply rate supplied to the fuel cell stack during hydrogen purge.

The method may further include adjusting the air supply rate after comparing when the air supply rate estimated in the comparing is less than the predetermined first air flow. In particular, the adjusting of the air supply rate may include setting a target air supply rate and adjusting an opening degree of an air control valve or a revolutions per minute (RPM) of an air compressor to cause the air supply rate to correspond the target air supply rate. The adjusting of the air supply rate may include opening an air control valve and, then, increasing an RPM of an air compressor.

The method may further include, after adjusting the air supply rate, comparing the estimated air supply rate and a predetermined second air flow, wherein, when the estimated air supply rate is equal to or greater than a predetermined second air flow, hydrogen purge may be performed. The predetermined second air flow may be set to a value equal to or less than a target air supply rate. After executing the hydrogen purge, an opening degree of an air control valve or an RPM of an air compressor may be adjusted to restore the air supply rate to an air supply rate required by the fuel cell stack.

Further, the executing of the hydrogen purge may include maintaining hydrogen purge on standby until the estimated air supply rate is equal to or greater than a predetermined first air flow when the estimated air supply rate is less than the predetermined first air flow. When hydrogen purge is on standby, a purge sustainment time may be varied based on a standby time of hydrogen purge during next hydrogen purge control. The purge sustainment time may be increased as the standby time of hydrogen purge is increased.

In accordance with another aspect of the present invention, a hydrogen purge control system may include a hydrogen purge controller configured to estimate a hydrogen concentration to determine a timing and to execute hydrogen purge, and a higher controller configured to estimate an air supply rate supplied to a fuel cell stack and to execute hydrogen purge based on the estimated air supply rate.

The higher controller may be configured to compare the estimated air supply rate and a predetermined first air flow and execute hydrogen purge at a timing when hydrogen purge is required when the estimated air supply rate is equal to or greater than the predetermined first air flow. The hydrogen purge control system may further include an air supply controller configured to execute hydrogen purge not to reduce an air supply rate supplied to the fuel cell stack during hydrogen purge.

The hydrogen purge control system may further include an air supply controller configured to adjust an opening degree of an air control valve or a revolution per minute (RPM) of an air compressor to cause the air supply rate to correspond to a target air supply rate set by the higher controller. In particular, the higher controller may be configured to compare the estimated air supply rate and a predetermined second air flow and execute hydrogen purge when the estimated air supply rate is equal to or greater than the predetermined second air flow.

The higher controller may be configured to maintain hydrogen purge on standby until the estimated air supply rate is equal to or greater than the predetermined first air flow when the estimated air supply rate is less than the predetermined first air flow. The higher controller may further be configured to vary and increase a purge sustainment time as a standby time of hydrogen purge is increased during next hydrogen purge control when hydrogen purge is on standby.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
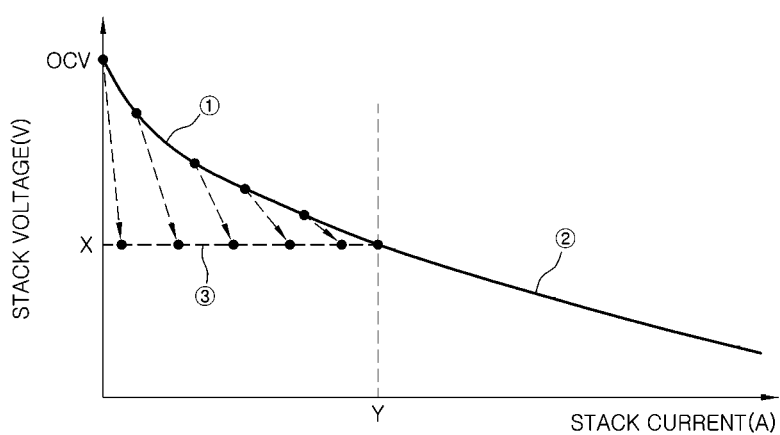
FIG. 1 is a graph of a I-V performance curve for driving a fuel cell stack according to a prior art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In exemplary embodiments of the present invention disclosed in the specification, specific structural and functional descriptions are merely illustrated for the purpose of illustrating embodiments of the invention and exemplary embodiments of the present invention may be embodied in many forms and are not limited to the embodiments set forth herein.

Exemplary embodiments of the present invention may be variously changed and embodied in various forms, in which illustrative embodiments of the invention are shown. However, exemplary embodiments of the present invention should not be construed as being limited to the embodiments set forth herein and any changes, equivalents or alternatives which are within the spirit and scope of the present invention should be understood as falling within the scope of the invention It will be understood that although the terms first, second, third etc. may be used herein to describe various elements, these elements should not be limited by these terms. These terms are only used to distinguish one element from another element. For example, a first element may be termed a second element and a second element may be termed a first element without departing from the teachings of the present invention.

It will be understood that when an element, such as a layer, a region, or a substrate, is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements or layers should be interpreted in a like fashion, e.g., "between," versus "directly between," "adjacent," versus "directly adjacent," etc.

The terms used in the present specification are used for explaining a specific exemplary embodiment, not limiting the present inventive concept. Thus, the singular expressions in the present specification include the plural expressions unless clearly specified otherwise in context.

Unless otherwise defined, all terms including technical and scientific terms used herein have the same meaning as commonly understood by one of ordinary skill in the art to which this inventive concept pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made in detail to the exemplary embodiments, examples of which are illustrated in the accompanying drawings. In the drawings, the same reference numerals in the drawings denote the same element.

Figure 2:
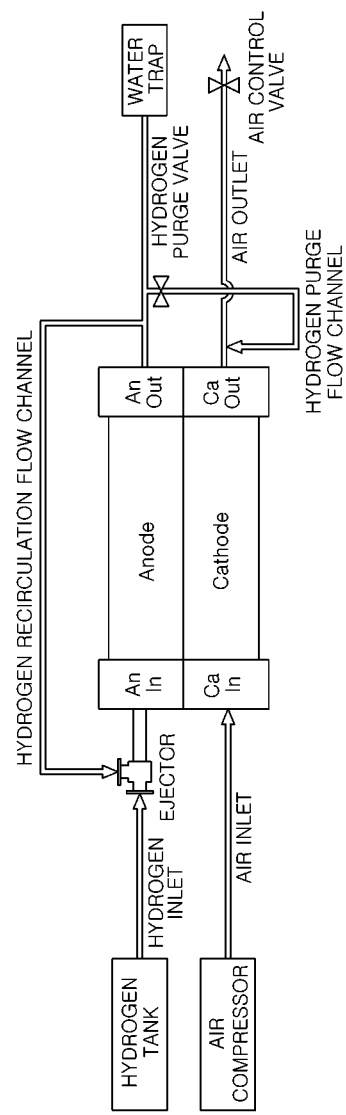
FIG. 2 is a diagram showing a moving path of a moving path of air and hydrogen according to an exemplary embodiment of the present invention.

FIG. 2 is a diagram showing a moving path of a moving path of air and hydrogen according to an exemplary embodiment of the present invention. Referring to FIG. 2, hydrogen introduced from a device for storing hydrogen, such as a hydrogen tank, through a hydrogen inlet may be mixed with hydrogen gas introduced through a hydrogen recirculation flow channel at an ejector, and may be supplied to an anode. Outside air may be introduced to an air inlet through an air compressor, may be supplied to a cathode and, then, may be discharged to an air outlet.

To maintain a hydrogen concentration in an anode of a fuel cell stack in a predetermined level (e.g., about 70%), hydrogen purge of externally discharging moisture and anode gas with reduced hydrogen concentration is required. Hydrogen purge may be periodically performed based on estimation of a hydrogen concentration in an anode. In addition, hydrogen purge may be simultaneously performed with cathode oxygen depletion (COD) control when a fuel cell is turned on and off or may be controlled via estimation of a partial pressure of hydrogen, stack current integration, or the executed while a fuel cell is driven.

To satisfy hydrogen emission standards, hydrogen purge may be performed to discharge hydrogen toward air discharged from a cathode and to attenuate a hydrogen concentration. When an air flow discharged from a cathode is equal to or greater than a predetermined amount, purged hydrogen gas is diluted with air discharged from the cathode and is externally discharged but, when a flow or pressure of air discharged from the cathode is less than a predetermined amount, purged hydrogen gas may flow backward and may be introduced into the cathode.

In particular, a reaction between hydrogen and oxygen may occur at the cathode and, accordingly, oxygen at the cathode may be removed and a voltage of a fuel cell stack may decrease substantially. In addition, control of reducing an air flow supplied to a fuel cell stack as described above in relation to the prior art may occupy 50% or more of whole driving in urban dynamometer driving schedule (UDDS). Accordingly, there is possibility that a voltage of a fuel cell stack drops due to hydrogen purge control and, thus, there is a need for a control method and control system for preventing voltage drop.

Figure 3:
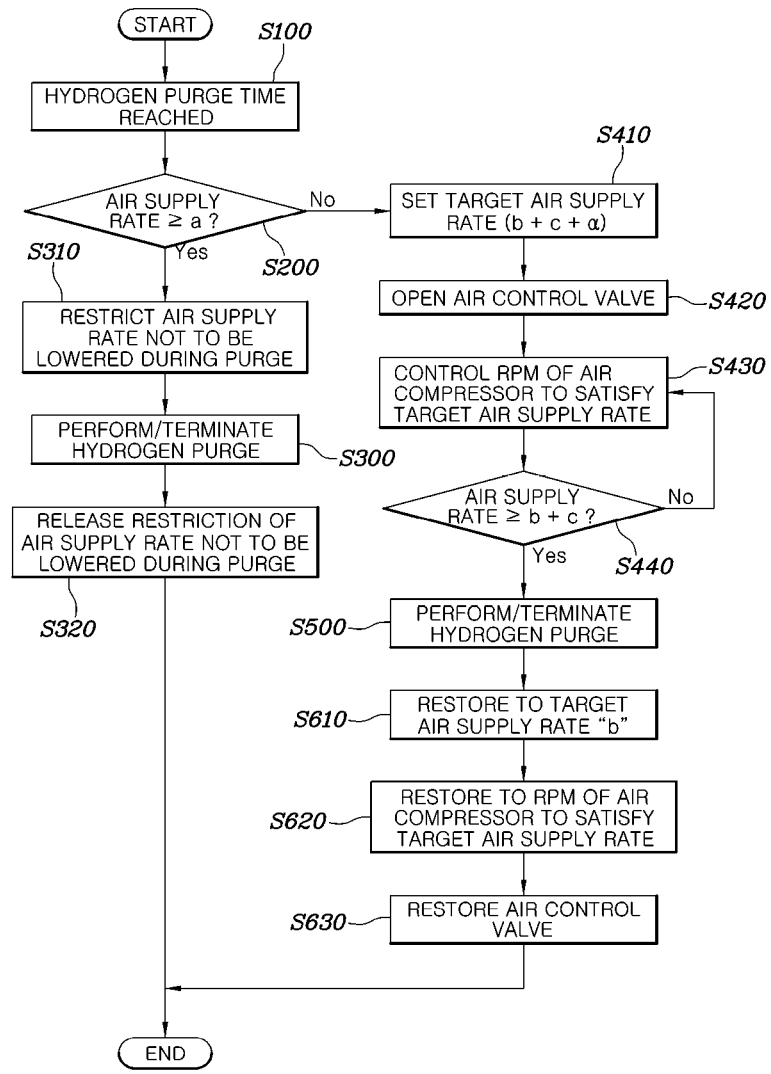
FIG. 3 is a flowchart of a hydrogen purge control method according to an exemplary embodiment of the present invention.

FIG. 3 is a flowchart of a hydrogen purge control method according to an exemplary embodiment of the present invention. The method described herein below may be executed by a controller having a processor and a memory. Referring to FIG. 3, the hydrogen purge control method according to an exemplary embodiment of the present invention may include estimating an air supply rate supplied to a fuel cell stack (S200), and controlling hydrogen purge based on the estimated air supply rate (S300 and S500).

The method may further include, prior to estimating the air supply rate (S200), estimating a hydrogen concentration and determining a timing when hydrogen purge is required (S100). A timing when hydrogen purge is required may be determined using various methods. For example, during the driving of a fuel cell, a timing when hydrogen purge is required may be determined by an estimation of a concentration or partial pressure of hydrogen, stack current integration, or the like. When the estimated hydrogen concentration is reduced to a predetermined hydrogen concentration, hydrogen purge may be determined to be required. In addition, hydrogen purge may be executed simultaneously with cathode oxygen depletion (COD) control when a fuel cell is turned on and off.

Further, an air supply rate supplied to a fuel cell stack may be estimated. In particular, an air supply rate supplied to a cathode of the fuel cell stack may be estimated using a sensor configured to measure an air supply rate and an air supply rate may be estimated using an air compressor driving condition as well as revolution per minute of an air compressor, air temperature, and so on. The air supply rate may refer to a flow of air supplied per unit hour.

The execution of hydrogen purge (S300 and S500) may include comparing the estimated air supply rate and a predetermined first air flow (S200) and, when the estimated air supply rate is equal to or greater than a predetermined first air flow, hydrogen purge may be executed at a timing when hydrogen purge is required (S300). The predetermined first air flow may be set to a value equal to or greater than a minimum air supply rate at which purged hydrogen does not flow backward to a cathode.

As described above, when an air flow supplied to a cathode of a fuel cell stack is equal to or less than a predetermined less, purged hydrogen may flow backward to the cathode and may be introduced into the fuel cell stack. A first air flow may be set to a value equal to or greater than a minimum air supply rate for preventing this phenomenon and, thus, when an air supply rate supplied to a fuel cell stack is equal to or greater than the first air flow, that the risk of the purged hydrogen flowing backward to a cathode may be eliminated.

In the executing of hydrogen purge (S300), an air supply of air supplied to a fuel cell stack may be controlled not to be reduced (e.g., the air supply rate may be maintained) during hydrogen purge (S310 and S320). In other words, when the estimated air supply rate is equal to or greater than a predetermined first air flow and hydrogen purge is performed at a timing when hydrogen purge is required, the air supply rate may be restricted not to be reduced (e.g., may be maintained) prior to hydrogen purge (S310) and reduction restriction of the air supply rate may be released after hydrogen purge (S320).

Hydrogen purge may be executed for a substantially short period of time but load fluctuation of a vehicle may occur for a shorter time and an air flow may be reduced while a hydrogen purge valve is open. Accordingly, an air supply rate needs to be prevented from being reduced to a predetermined level or less to maintain a minimum air flow during purge. Particularly, the predetermined level may be a first air flow. Accordingly, during hydrogen purge, an air compressor may be prevented from being operated to be less than a specific revolution per minute (RPM) or an air control valve may be prevented from being operated to be less than a specific opening degree. In other words, the air compressor may be maintained at a particular RPM and the air control valve may be maintained at a particular opening degree.

The method may further include, when the estimated air supply rate is less than a predetermined first air flow in the comparing (S200), adjusting the air supply rate (S410, S420, and S430). In other words, according to an exemplary embodiment of the present invention, when an air supply rate is low and hydrogen purge is performed, when there is the possibility that purged hydrogen flows backward, an air supply rate may be adjusted and, then, hydrogen purge may be executed.

The adjusting of the air supply rate (S410, S420, and S430) may include setting a target air supply rate (S410) and adjusting an opening degree of an air control valve or an RPM of an air compressor may be adjusted to cause an air supply rate to correspond a target air supply rate (S420 and S430). The method may further include, after adjusting the air supply rate (S410, S420, and S430), comparing the estimated air supply rate and a predetermined second air flow (S440). When the estimated air supply rate is equal to or greater than the predetermined second air flow, hydrogen purge may be executed (S500).

The target air supply rate and the predetermined second air flow may be set in consideration of an air flow that is currently required by a fuel cell stack and an oxygen amount to be consumed as purged hydrogen flows backward. The air flow required by the fuel cell stack may be set to an air flow required for power generation of a fuel cell stack based on current or voltage of the fuel cell stack. The predetermined second air flow may be a target air supply rate or less. In other words, the target air supply rate is a target value for adjustment of an air supply rate and, accordingly, may be set to be greater than a second air flow to rapidly increase an air supply rate.

In particular, for example, when a hydrogen purge valve is open and hydrogen is performed in a low output mode of a fuel cell stack, when the hydrogen purge valve is assumed to be open for about 0.4 seconds, 1 [L] of purged hydrogen gas (hydrogen+vapor+nitrogen, etc.) may be discharged. A hydrogen concentration of purged hydrogen gas is about 60% and, thus, about 0.6 [L] of hydrogen may be purged and 0.6 [L] of hydrogen may completely consume 0.3 [L] of oxygen. Assuming that a ratio of oxygen in air is about 20%, this may be an amount for completely consuming oxygen in 1.5 [L] of air.

Additionally, to supply 1.5 [L] of air, the supply may be executed for about 0.4 seconds during hydrogen purge, and at least 225 liter per minutes (LPM) of an air supply rate of a fuel cell stack needs to be supplied. Accordingly, even when oxygen is consumed as purged hydrogen flows backward, oxygen may be supplied to the cathode. Similar to the above example, the second air flow may be set to an air flow obtained by the sum of an air flow "c" including an oxygen amount consumed as purged hydrogen flows backward and an air flow "b" required by a fuel cell stack. The target air supply rate may be a set to a value obtained by adding a predetermined margin "+α" to the second air flow.

When the estimated air supply rate is equal to or greater than the predetermined second air flow (S440), hydrogen purge may be executed (S500). Particularly, the air supply rate may also be restricted not to be reduced during hydrogen purge. The adjusting of the air supply rate (S410, S420, and S430) may include adjusting opening of an air control valve or revolution of an air compressor to adjust an air supply rate. An RPM of an air compressor is not capable of being controlled to be equal to or less than a predetermined RPM or to be equal to or greater than the RPM and, accordingly, the air compressor may be operated along with the air control valve to adjust an air supply rate in a greater range.

In particular, the air control valve may be open (S420) and, then, the RPM of the air compressor may be increased (S430). Even when an RPM of the air compressor is increased while the air control valve is insufficiently open, a flow may not increase and an excessive pressure may be generated thus causing damage to hardware. Accordingly, when the air control valve is open and, then, an RPM of the air compressor is increased, the air supply rate may be advantageously increased.

After executing the hydrogen purge (S500), an opening degree of an air control valve or an RPM of an air compressor may be adjusted to cause the air supply rate to be restored to an air supply rate "b" requested by a fuel cell stack (S610, S620, and S630). In particular, the target air supply rate may be set to an air flow "b" requested by the fuel cell stack and an air supply rate may be adjusted to correspond to the air flow "b" (S610). When the air supply rate is reduced, an RPM of the air compressor may be reduced (S620) and, then, an opening degree of the air control valve may be reduced (S630).

Figure 4:
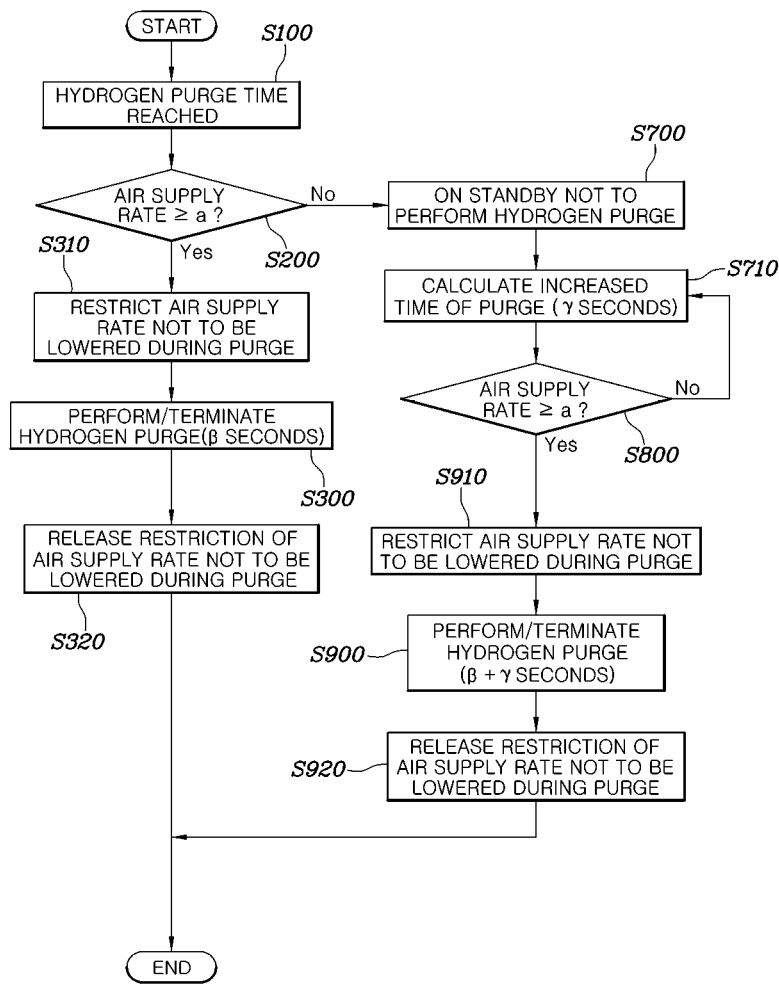
FIG. 4 is a flowchart of a method of controlling hydrogen purge according to another exemplary embodiment of the present invention.

FIG. 4 is a flowchart of a method of controlling hydrogen purge according to another exemplary embodiment of the present invention. Referring to FIG. 4, executing of hydrogen purge (S300 and S900) of the hydrogen purge control method according to another exemplary embodiment of the present invention may include maintaining hydrogen purge on standby (S700) until the estimated air supply rate is equal to or greater than a predetermined first air flow when the estimated air supply rate is less than the predetermined first air flow (S200).

In other words, in the exemplary embodiment of FIG. 3, an air supply rate may be actively adjusted to perform hydrogen purge and, on the other hand, in the corresponding embodiment, passively, hydrogen purge may be on standby until the estimated air supply rate is equal to or greater than the predetermined first air flow. When hydrogen purge is on standby, a purge sustainment time may be varied based on a standby time when hydrogen purge is on standby during next hydrogen purge control (S710). In particular, as a standby time when hydrogen purge is on standby is increased, a purge sustainment time may be varied to be increased. A purge sustainment time may be a time when a hydrogen purge valve is open.

In other words, when hydrogen purge is performed at an ordinary time (e.g., not on standby), the purge sustainment time may be adjusted to β seconds (S300) but when hydrogen purge is on standby until the estimated air supply rate is equal to or greater than a predetermined first air flow (S800) and, then, hydrogen purge is performed (S900), the purge sustainment time may be varied to β+γ seconds obtained by adding γ seconds to β seconds (S710). In particular, γ seconds may be increased in proportion to a standby time when hydrogen purge is on standby and may not be increased to a predetermined upper limit or greater. When hydrogen purge is on standby until the estimated air supply rate is equal to or greater than the predetermined first air flow (S800) and, then, hydrogen purge is performed (S900), reduction in the air supply rate may also be restricted during purge (S910 and S920).

Figure 5:
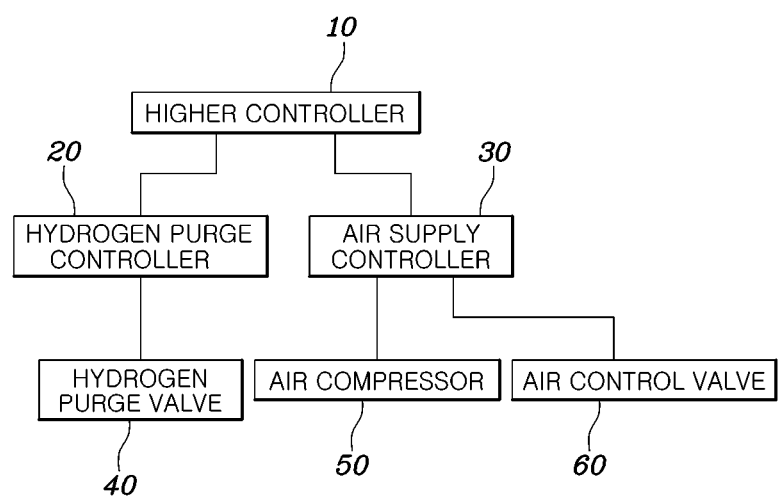
FIG. 5 is a diagram of a structure of a system for controlling hydrogen purge according to an exemplary embodiment of the present invention.

A description of the same parts as in FIG. 3 is omitted here. FIG. 5 is a diagram of a structure of a system for executing hydrogen purge according to an exemplary embodiment of the present invention. Referring to FIG. 5, the hydrogen purge control system according to an exemplary embodiment of the present invention may include a hydrogen purge controller 20 configured to estimate a hydrogen concentration to determine a timing when hydrogen purge is required and to execute hydrogen purge, and a higher controller 10 (e.g., an overall or upper controller) configured to estimate an air supply rate supplied to a fuel cell stack and to control hydrogen purge based on the estimated air supply rate.

The higher controller 10 may be configured to compare the estimated air supply rate with a predetermined first air flow. When the estimated air supply rate is equal to or greater than a predetermined first air flow, hydrogen purge may be executed at a timing when hydrogen purge is required. The hydrogen purge control system may further include an air supply controller 30 configured to adjust the air supply rate supplied to the fuel cell stack not to be reduced during hydrogen purge.

Further, the hydrogen purge control system may further include the air supply controller 30 configured to adjust an opening degree of an air control valve 60 or an RPM of an air compressor 50 to cause the air supply rate to correspond a target air supply rate set by the higher controller 10. In particular, the higher controller 10 may be configured to compare the estimated air supply rate and the predetermined second air flow and, when the estimated air supply rate is equal to or greater than the predetermined second air flow, hydrogen purge may be executed.

When the estimated air supply rate is less than the predetermined first air flow, the higher controller 10 may be configured to maintain hydrogen purge on standby until the estimated air supply rate is equal to or greater than the predetermined first air flow. When hydrogen purge is on standby, the higher controller 10 may be configured to vary and increase a purge sustainment time as a standby time when hydrogen purge is on standby is increased during next hydrogen purge control.

The hydrogen purge controller 20 may further be configured to determine a hydrogen purge timing and operate a hydrogen purge valve 40 to perform hydrogen purge. The air supply controller 30 may be configured to adjust a revolution per minute (RPM) of the air compressor 50 and an opening degree of the air control valve 60 to adjust a flow of air supplied to a cathode of a fuel cell stack. The higher controller 10 may be a fuel cell controller (FCU) configured to operate each of the air supply controller 30 and the hydrogen purge controller 20 as a higher controller and the air supply controller 30 and the hydrogen purge controller 20 may be separate controllers or may be included in the fuel cell controller.

A detailed control method of a control system is the same as the above description of the control method and thus is not described here. As is apparent from the above description, according to a method and apparatus for controlling hydrogen purge according to the present invention, a concentration of hydrogen gas supplied to a hydrogen electrode may be appropriately maintained.

A situation in which purged hydrogen flows backward to an air electrode and a stack voltage is dropped may be prevented. In addition, a voltage of a fuel cell stack may be maintained to an upper limit voltage or less during driving at a low flow to enhance the durability of the fuel cell stack and the productivity of a vehicle.

Although the exemplary embodiments of the present invention have been described above with reference to the accompanying drawings, those skilled in the art will appreciate that the present invention can be implemented in various other embodiments without changing the technical ideas or features thereof.

What is claimed is:

1. A method of controlling hydrogen purge to prevent purged hydrogen from flowing backward to an air electrode, comprising:
   estimating, by a controller, a concentration of hydrogen;
   determining, by the controller, a timing when hydrogen purge is required;
   estimating, by the controller, an air supply rate supplied to a fuel cell stack; and
   executing, by the controller, hydrogen purge based on the estimated air supply rate,
   wherein the executing of hydrogen purge comprises comparing, by the controller, the estimated air supply rate and a predetermined first air flow,
   wherein, when the estimated air supply rate is equal to or greater than the predetermined first air flow, hydrogen purge is executed at the timing when hydrogen purge is required,
   wherein the timing when hydrogen purge is required is determined by the estimated concentration of hydrogen,
   wherein the predetermined first air flow is set to a value equal to or greater than a minimum air supply rate at which purged hydrogen discharged from the fuel cell stack does not flow backward to the air electrode, and
   wherein the executing of hydrogen purge further comprises:
     preventing, by the controller, a reduction of the air supply rate supplied to the fuel cell stack during the hydrogen purge; and
     maintaining, by the controller, hydrogen purge on standby until the estimated air supply rate is equal to or greater than a predetermined first air flow when the estimated air supply rate is less than the predetermined first air flow;
     wherein, when the hydrogen purge is on standby, a purge sustainment time is varied based on a standby time of hydrogen purge during next hydrogen purge control.

2. The method of claim 1, further comprising adjusting, by the controller, the air supply rate in the comparing when the air supply rate estimated in the comparing is less than the predetermined first air flow.

3. The method of claim 2, wherein the adjusting of the air supply rate comprises opening an air control valve and then increasing a revolutions per minute (RPM) of an air compressor.

4. The method of claim 2, wherein the adjusting of the air supply rate comprises:
setting, by the controller, a target air supply rate and adjusting an opening degree of the air control valve or the RPM of the air compressor to adjust the air supply rate to correspond to the target air supply rate.

5. The method of claim 2, further comprising:
after adjusting the air supply rate, comparing, by the controller, the estimated air supply rate and a predetermined second air flow,
wherein when the estimated air supply rate is equal to or greater than the predetermined second air flow, hydrogen purge is executed.

6. The method of claim 5, wherein the predetermined second air flow is set to a value equal to or less than a target air supply rate.

7. The method of claim 1, wherein, after executing the hydrogen purge, an opening degree of an air control valve or a revolutions per minute (RPM) of an air compressor is adjusted to restore the air supply rate to an air supply rate required by the fuel cell stack.

8. The method of claim 1, wherein the purge sustainment time is increased as the standby time of hydrogen purge is increased.

* * * * *